(12) United States Patent
Mao et al.

(10) Patent No.: US 11,368,096 B2
(45) Date of Patent: Jun. 21, 2022

(54) CONTROL METHOD, CONTROL DEVICE AND ELECTRONIC APPARATUS OF RESONANT CIRCUIT

(71) Applicant: Zhaoqi Mao, Zhejiang (CN)

(72) Inventors: Zhaoqi Mao, Zhejiang (CN); Jizhou Wang, Zhejiang (CN); Naiquan Ke, Zhejiang (CN)

( * ) Notice: Subject to any disclaimer, the term of this patent is extended or adjusted under 35 U.S.C. 154(b) by 0 days.

(21) Appl. No.: 17/258,389

(22) PCT Filed: Jun. 19, 2020

(86) PCT No.: PCT/CN2020/096930
§ 371 (c)(1),
(2) Date: Jan. 6, 2021

(87) PCT Pub. No.: WO2021/143045
PCT Pub. Date: Jul. 22, 2021

(65) Prior Publication Data
US 2021/0367522 A1    Nov. 25, 2021

(30) Foreign Application Priority Data
Jan. 17, 2020   (CN) .......................... 202010055749.1

(51) Int. Cl.
*H02M 3/335* (2006.01)
*H02M 3/00* (2006.01)
*H02M 1/00* (2006.01)

(52) U.S. Cl.
CPC ......... *H02M 3/33569* (2013.01); *H02M 3/01* (2021.05); *H02M 1/0095* (2021.05)

(58) Field of Classification Search
CPC ......... H02M 1/0095; H02M 3/01–015; H02M 3/335–3378
See application file for complete search history.

(56) References Cited

U.S. PATENT DOCUMENTS 10,097,109 B1 * 10/2018 Ye ........................... H02M 1/10
2009/0316443 A1 * 12/2009 Coccia .............. H02M 3/33569
363/21.06

(Continued)

FOREIGN PATENT DOCUMENTS

| CN | 101800475 A | 8/2010 |
| CN | 103078414 A | 5/2013 |

(Continued)

OTHER PUBLICATIONS

Lee, J. S. et al., "Three-switch LLC resonant converter for high efficiency adapter with universal input voltage," 2017 IEEE 3rd International Future Energy Electronics Conference and ECCE Asia (IFEEC 2017—ECCE Asia), 2017, pp. 1095-1100, doi: 10.1109/IFEEC.2017.7992194. (Year: 2017).*

*Primary Examiner* — Fred E Finch, III
(74) *Attorney, Agent, or Firm* — Rumit Ranjit Kanakia

(57) ABSTRACT

A control method includes the steps of: setting first control periods of a switching transistor group, the first control periods including operating periods in the first driving mode and operating periods in the second driving mode; setting an output voltage and a K value in a directly proportional relationship, wherein the K value is the ratio of the number of the operating periods in the second driving mode to the number of the operating periods in the first driving mode; receiving the output voltage, and determining a K value corresponding to the existing output voltage according to the set relationship between the output voltage and the K value; and outputting a driving signal group of the switching transistor group according to the number of the operating periods in the first driving mode and the number of the operating periods in the second driving mode.

7 Claims, 2 Drawing Sheets

(56) References Cited

U.S. PATENT DOCUMENTS

| | | | |
|---|---|---|---|
| 2016/0172989 A1 | 6/2016 | Lee | |
| 2018/0337610 A1* | 11/2018 | Leong | H02M 3/33523 |
| 2019/0068069 A1* | 2/2019 | Sheng | H02M 3/33576 |
| 2019/0222129 A1* | 7/2019 | Wang | H02M 3/33569 |
| 2020/0228017 A1* | 7/2020 | Hu | H02M 3/07 |
| 2020/0321879 A1* | 10/2020 | Zhang | H02M 3/33507 |
| 2020/0366215 A1* | 11/2020 | Chen | H02M 3/33592 |
| 2021/0050793 A1* | 2/2021 | Bala | H02M 3/33507 |
| 2021/0067045 A1* | 3/2021 | Zhang | H02M 7/483 |
| 2021/0194374 A1* | 6/2021 | Deng | H02M 1/4241 |
| 2021/0226534 A1* | 7/2021 | Lu | H02M 3/158 |
| 2021/0273566 A1* | 9/2021 | Sigamani | H02M 3/3353 |
| 2021/0273578 A1* | 9/2021 | Sigamani | H02M 1/0074 |

FOREIGN PATENT DOCUMENTS

| | | |
|---|---|---|
| CN | 105790626 A | 7/2016 |
| CN | 107437900 A | 12/2017 |
| CN | 111211696 A | 5/2020 |

* cited by examiner

CONTROL METHOD, CONTROL DEVICE AND ELECTRONIC APPARATUS OF RESONANT CIRCUIT

FIELD OF THE INVENTION

The invention belongs to the technical field of resonant circuits, and particularly relates to a control method of a resonant circuit with a high input voltage.

BACKGROUND OF THE INVENTION

In a switching power supply, high efficiency and high density of a resonant circuit is often employed in high-power applications. The resonant circuit includes at least two switching transistors conducted complementarily, a resonant inductor, a resonant capacitor and a transformer. When the input voltage is very high, the switching transistors and the resonant capacitor of the resonant circuit need a very high voltage rating to solve the stress problem caused by high input voltage, resulting in high cost.

A resonant circuit generally controls its output voltage by controlling the operating frequency of switching transistors. Specifically, a frequency control method means that a control circuit of a resonant circuit outputs driving signals for switching transistors, controls respective switching transistors to have a constant duty cycle (50%), equal frequency and complementary conduction, and adjusts the frequency of the driving signals so as to change the resonant impedance of the resonant circuit, thereby achieving the purpose of adjusting the output voltage.

When the switching transistors operate at different frequencies, the output efficiency of the resonant circuit is different. If the amplitude of the output voltage of the resonant circuit is required to be in a wider range, the frequency of the switching transistors must also be in a wider range. In other words, the existing frequency control method of the resonant circuit cannot meet a wide output voltage range and narrow operating frequency range design.

SUMMARY OF THE INVENTION

An object of the invention is to provide a control method, a control device and an electronic apparatus of a resonant circuit, wherein the resonant circuit is controlled to operate in two driving modes, so that the operating frequency of a switching transistor is not adjusted in an excessively wide range, and hence the resonant circuit can meet a wide output voltage range and narrow operating frequency range design, thereby solving the existing technical problems.

To solve the technical problems above, the invention is achieved by the following technical solutions.

A control method, a control device and an electronic apparatus of a resonant circuit are provided, wherein the control method comprises:

setting the first control periods of the switching transistor group, the first control periods including operating periods in the first driving mode and operating periods in the second driving mode;

setting an output voltage and a K value in a directly proportional relationship, wherein the K value is the ratio of the number of the operating periods in the second driving mode to the number of the operating periods in the first driving mode;

receiving the output voltage, and determining a K value corresponding to the existing output voltage according to the set relationship between the output voltage and the K value; and outputting a driving signal group of the switching transistor group according to the number of the operating periods in the first driving mode and the number of the operating periods in the second driving mode;

wherein the resonant circuit includes the first capacitor $C_1$, the second capacitor $C_2$, the first switching transistor $S_1$, the second switching transistor $S_2$, the third switching transistor $S_3$, the resonant capacitor $C_r$, the resonant inductor $L_r$, the first diode $D_1$, the second diode $D_2$, a transformer and a rectification circuit.

Optionally, the first driving mode is that the first switching transistor and the third switching transistor are conducted alternately within the non-conduction time of the second switching transistor, and the second driving mode is that the first switching transistor and the third switching transistor are conducted simultaneously, and conducted complementarily to the second switching transistor.

Optionally, the method further comprises the steps of:

detecting the output voltage, and amplifying the difference between the detection signal and the reference signal to generate a feedback signal; and adjusting the length of the operating periods of the driving signal group according to the feedback signal so as to adjust the value of the output voltage to be equal to a desired value.

Optionally, the reference signal sets a desired value of the output voltage, and the magnitude of the feedback signal represents the difference between the output voltage and the desired value.

Optionally, the number of the operating periods in the first driving mode and the number of the operating periods in the second driving mode are both set according to the set relationship between the output voltage and the K value.

Optionally, the switching transistor group includes the first switching transistor, the second switching transistor and the third switching transistor, and the first control periods include multiple operating periods of the second switching transistor.

Optionally, the first switching transistor, the second switching transistor and the third switching transistor have the same operating periods in the second driving mode.

Optionally, the operating periods of the second switching transistor in the first driving mode are the same as those of each switching transistor in the second driving mode, and the operating periods of the first switching transistor and the third switching transistor in the second driving mode are twice those of the second switching transistor in the first driving mode.

A control device of a resonant circuit includes:

a device configured to set the first control periods of the switching transistor group, the first control periods including operating periods in the first driving mode and operating periods in the second driving mode;

a device configured to set an output voltage and a K value in a directly proportional relationship, wherein the K value is the ratio of the number of the operating periods in the second driving mode to the number of the operating periods in the first driving mode;

a device configured to receive the output voltage, and determine a K value corresponding to the existing output voltage according to the set relationship between the output voltage and the K value; and a device configured to output a driving signal group of the switching transistor group according to the number of the operating periods in the first driving mode and the number of the operating periods in the second driving mode;

wherein the resonant circuit includes the first capacitor $C_1$, the second capacitor $C_2$, the first switching transistor $S_1$, the second switching transistor S2, the third switching transistor S3, the resonant capacitor Cr, the resonant inductor Lr, the first diode D1, the second diode D2, a transformer and a rectification circuit.

An electronic apparatus is provided, wherein the above-mentioned control device is applied thereto.

The embodiments of the invention have the following beneficial effects:

In the control method of the present application, by adjusting the control periods T1, the switching transistors operate in two different driving modes within the same control period. Under the operating frequency (the operating periods T2) of the same switching transistor, the output voltage of the resonant circuit in the first driving mode is higher than that in the second driving mode. Therefore, the ratio of the resonant circuit operating duration in the first driving mode to the operation duration of the resonant circuit in the second driving mode during the control periods T1 can be adjusted by changing the K value, thereby adjusting the output voltage of the resonant circuit. Under the control of the driving mode switching above, the operating frequency (the operating periods T2) of the switching transistors is further adjusted by the feedback signal, so that the output voltage can be stabilized at the desired value. In the present application, the resonant circuit is controlled to operate in the two driving modes, so that the operating frequency of the switching transistors is not adjusted in an excessively wide range, and hence the resonant circuit can meet a wide output voltage range and narrow operating frequency range design.

It is not necessary to achieve all the advantages above at the same time to implement any of the products related to the invention.

BRIEF DESCRIPTION OF THE DRAWINGS

In order to illustrate the technical solutions in the embodiments of the invention more clearly, the accompanying drawings to be used in the descriptions of the embodiments will be simply introduced below. Apparently, the accompanying drawings in the descriptions below only involve some embodiments of the invention, and one of ordinary skill in the art can also obtain other accompanying drawings without inventive work based on these accompanying drawings.

DETAILED DESCRIPTION OF THE INVENTION

The technical solutions in the embodiments of the invention will be clearly and completely described below in conjunction with the drawings in the embodiments of the invention. It is apparent that the described embodiments are only part of rather than all of the embodiments in the invention. Based on the embodiments of the invention, all other embodiments obtained by the ordinary persons skilled in the art without inventive work belong to the protection scope of the invention.

In order to keep the following description of the embodiments of the invention clear and concise, detailed descriptions of known functions and known components are omitted in the invention.

Figure 1:
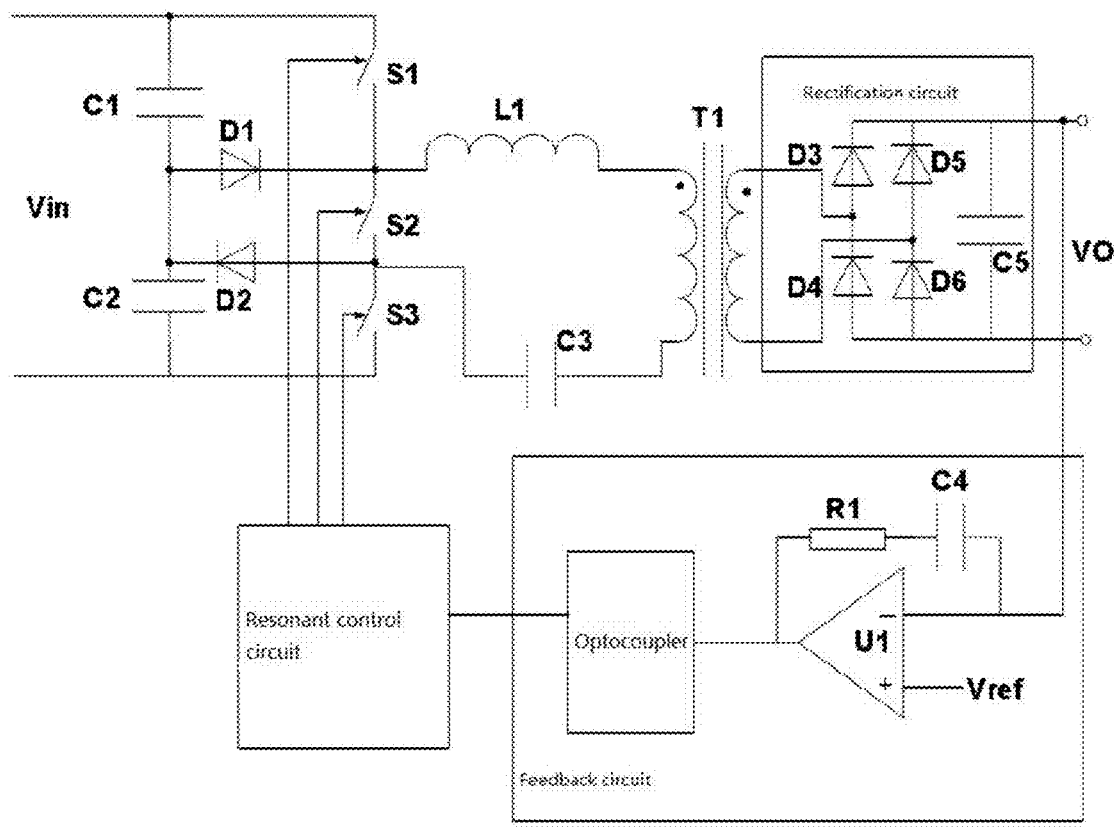
FIG. 1 is a diagram of a resonant circuit of an embodiment of the invention.
Figure 2:
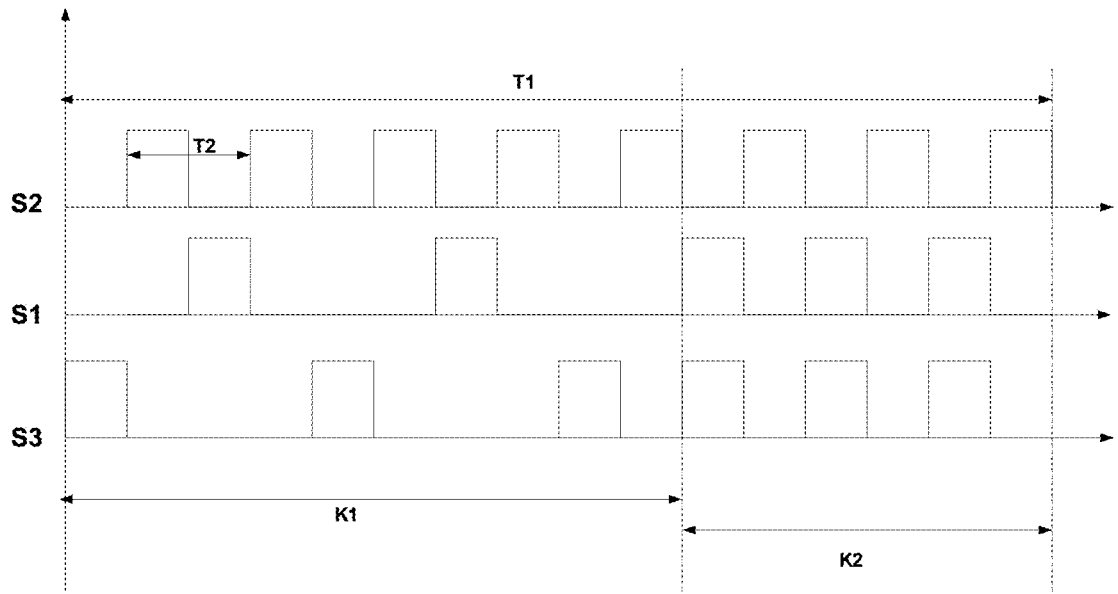
FIG. 2 is a diagram of driving signals of respective switching transistors in a control method of an embodiment of the invention.
Figure 3:
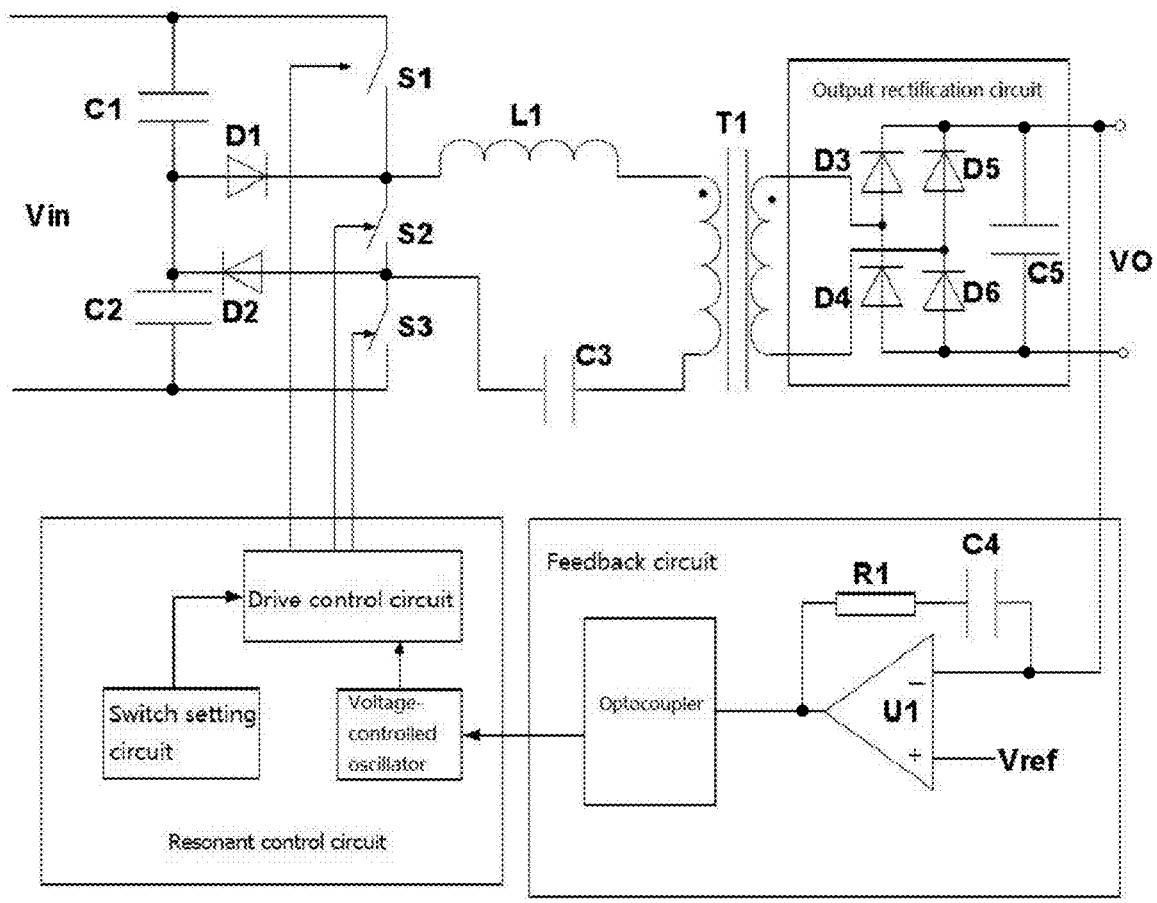
FIG. 3 is a diagram of a resonant circuit of another embodiment of the invention.

Referring to FIGS. 1 to 3, in this embodiment, a control method of a resonant circuit is provided, which comprises the steps of;

S01: setting the first control periods T1 of the switching transistor group, the first control periods T1 including operating periods in the first driving mode and operating periods in the second driving mode; and setting an output voltage Vo and a K value in a directly proportional relationship, i.e. the output voltage Vo being positively correlated with K, and the greater the value of the output voltage Vo, the greater the K value, wherein the K value is the ratio of the number K1 of the operating periods in the second driving mode to the number K2 of the operating periods in the first driving mode, i.e. K=K2:K1;

S02: receiving the output voltage Vo, and determining a K value corresponding to the existing output voltage Vo according to the set relationship between the output voltage Vo and the K value;

S03: outputting a driving signal group of the switching transistor group according to the number K1 of the operating periods in the first driving mode and the number K2 of the operating periods in the second driving mode; wherein, specifically, the switching transistor group includes the first switching transistor S1, the second switching transistor S2 and the third switching transistor S3; the driving signal group includes the first driving signal V1, the second driving signal V2 and the third driving signal V3; and the first driving signal V1, the second driving signal V2 and the third driving signal V3 of the first switching transistor S1, the second switching transistor S2 and the third switching transistor S3 are outputted respectively according to the values of K1 and K2;

S04: detecting the output voltage Vo, and amplifying the difference between the detection signal and the reference signal to generate a feedback signal, wherein the reference signal sets a desired value of the output voltage, and the magnitude of the feedback signal represents the difference between the output voltage Vo and the desired value; and S05: adjusting the length of the operating periods T2 of the driving signal group according to the feedback signal so as to adjust the value of the output voltage Vo to be equal to the desired value;

wherein the resonant circuit includes the first capacitor C1, the second capacitor C2, the first switching transistor S1, the second switching transistor S2, the third switching transistor S3, the resonant capacitor Cr, the resonant inductor Lr, the first diode D1, the second diode D2, a transformer and a rectification circuit.

Specifically, in this embodiment, as shown in FIG. 1, the resonant circuit includes the first capacitor C1, the second capacitor C2, the first switching transistor S1, the second switching transistor S2, the third switching transistor S3, the resonant capacitor Cr, the resonant inductor Lr, the first diode D1, the second diode D2, a transformer and a rectification circuit.

In one aspect of this embodiment, the first driving mode is that the first switching transistor S1 and the third switching transistor S3 are conducted alternately within the non-conduction time of the second switching transistor S2, and the second driving mode is that the first switching transistor S1 and the third switching transistor S3 are conducted simultaneously, and conducted complementarily to the second switching transistor S2.

In one aspect of this embodiment, the number of the operating periods in the first driving mode and the number of the operating periods in the second driving mode are both set according to the set relationship between the output voltage Vo and the K value.

In one aspect of this embodiment, the first control periods T1 include multiple operating periods T2 of the second switching transistor S2. In this embodiment, N operating periods T2 are set, wherein K1+K2=N.

In one aspect of this embodiment, the first switching transistor S1, the second switching transistor S2 and the third switching transistor S3 have the same operating periods in the second driving mode.

In one aspect of this embodiment, the operating periods of the second switching transistor S2 in the first driving mode are the same as those of each switching transistor in the second driving mode, and the operating periods of the first switching transistor S1 and the third switching transistor S3 in the second driving mode are twice those of the second switching transistor S2 in the first driving mode.

In one aspect of this embodiment, in the step S05, the output voltage Vo of the resonant circuit is detected, and the difference between the detection signal and the reference signal is amplified to generate a feedback signal. In this embodiment, an implementation of this step is provided. As shown in FIG. 1, a feedback circuit is included, an integrated operational amplifier U1 of the feedback circuit detects a signal of the output voltage Vo at an inverting input terminal thereof and is connected to the reference signal Vref at a non-inverting input terminal thereof, the difference is amplified through the integrated operational amplifier U1 as well as R1 and C4, and the signal at an output terminal of the integrated operational amplifier U1 is a feedback signal. Since the resonant circuit is an isolation circuit, an optocoupler is required for isolation in a control circuit. A resonant control circuit sets the first control periods T1 of the switching transistor group as well as values of K1 and K2, the operating frequency of a switching transistor is adjusted according to a feedback signal received at an input terminal, and the corresponding first driving signal V1, second driving signal V2 and third driving signal V3 are outputted according to the above values, thereby driving the first switching transistor S1, the second switching transistor S2 and the third switching transistor S3 respectively.

For example, the first control periods T1 of the switching transistor group is set, as shown in FIG. 2, the first control periods T1 include 8 operating periods T2 of the second switching transistor S2; and the number of the operating periods in the first driving mode and the number of the operating periods in the second driving mode in the first control periods T1 are set as K1=5 and K2=3 respectively, i.e. in the control periods T1, based on the switching periods T2 of the second switching transistor S2, T1 has 8 switching periods T2 in total, thereby setting that the switching transistor operates in 5 operating periods of the second switching transistor S2 in the first driving mode and 3 operating periods of the second switching transistor S2 in the second driving mode. Moreover, the resonant circuit is cyclically controlled with the periods T1, so that the resonant circuit operates in the two driving modes within each control period.

In this embodiment, a particular embodiment of a resonant control circuit is provided. As shown in FIG. 3, the resonant control circuit includes a drive control circuit, a voltage-controlled oscillator and a switch setting circuit; wherein the switch setting circuit sets control periods T1, and values of K1 and K2 in different driving modes within the same control period, determines the above three parameters, and outputs the parameters to the drive control circuit.

The voltage-controlled oscillator receives a feedback signal, and determines the length of the operating periods T2 of the switching transistor S2 according to the feedback signal. In this way, the operating periods of the switching transistors S1 and S3 are also indirectly determined. The operating periods and the operating frequency are reciprocal to each other. Different operating periods correspond to different output voltages Vo of the resonant circuit, and the output voltage Vo of the resonant circuit can be adjusted to be equal to a desired value through closed-loop adjustment.

In this embodiment, there is also provided a control device of a resonant circuit, wherein the control device is loaded with the method according to any of the above aspects, and the control device further includes:

a device configured to set the first control periods T1 of the switching transistor group, the first control periods T1 including operating periods in the first driving mode and operating periods in the second driving mode;

a device configured to set an output voltage Vo and a K value in a directly proportional relationship, wherein the K value is the ratio of the number of the operating periods in the second driving mode to the number of the operating periods in the first driving mode;

a device configured to receive the output voltage Vo, and determine a K value corresponding to the existing output voltage Vo according to the set relationship between the output voltage Vo and the K value; and a device configured to output a driving signal group of the switching transistor group according to the number of the operating periods in the first driving mode and the number of the operating periods in the second driving mode;

wherein the resonant circuit includes the first capacitor C1, the second capacitor C2, the first switching transistor S1, the second switching transistor S2, the third switching transistor S3, the resonant capacitor Cr, the resonant inductor Lr, the first diode D1, the second diode D2, a transformer and a rectification circuit.

An electronic apparatus is provided, wherein the above-mentioned control device is applied thereto.

The above embodiments can be combined with each other.

It should be noted that in the depiction of the present description, descriptions such as "first" and "second" are only used to distinguish various features, and have no actual order or directional meaning, and therefore the present application is not limited thereto.

In the depiction of the present description, descriptions of reference terms such as "one embodiment", "example" and "specific example" mean that specific features, structures, materials or characteristics described in conjunction with this embodiment or example are included in at least one embodiment or example of the invention. In the present description, the schematic expressions of the above terms do not necessarily refer to the same embodiment or example. Furthermore, the specific features, structures, materials or characteristics described can be combined in any suitable manner in any of one or more embodiments or examples.

The preferred embodiments of the invention disclosed above are only used to help explain the invention. The preferred embodiments neither fully describe all the details, nor limit the invention to the particular embodiments described above. Obviously, many modifications and changes can be made according to the contents of the present description. These embodiments are selected and specifically described in the present description so as to better explain the principles and practical applications of the invention, so that those skilled in the art can better under-

The invention claimed is:

1. A control method of a resonant circuit, comprising:
   setting a first control periods of a switching transistor group, the first control periods including operating periods in a first driving mode and operating periods in a second driving mode;
   setting a range of output voltages and a range of K values in a directly proportional relationship, wherein each individual K value of the range of K values is the ratio of a number of the operating periods in the second driving mode to a number of the operating periods in the first driving mode;
   receiving an existing output voltage, and determining the individual K value corresponding to the existing output voltage according to the directly proportional relationship between the range of output voltages and the range of K values; and
   outputting a driving signal group of the switching transistor group according to a number of operating periods in the first driving mode and a number of operating periods in the second driving mode corresponding to the ratio of the determined, individual K value;
   wherein the resonant circuit includes a first capacitor, a second capacitor, a first switching transistor, a second switching transistor, a third switching transistor, a resonant capacitor, a resonant inductor, a first diode, a second diode, a transformer and a rectification circuit:
   the switching transistor group comprises the first switching transistor, the second switching transistor, and the third switching transistor;
   wherein the first driving mode is that the first switching transistor and the third switching transistor are conducted alternately within the non-conduction time of the second switching transistor, and the second driving mode is that the first switching transistor and the third switching transistor are conducted simultaneously, and conducted complementarily to the second switching transistor.

2. The control method of a resonant circuit according to claim 1, further comprising the steps of:
   detecting the output voltage, and amplifying the difference between a detection signal and a reference signal to generate a feedback signal; and
   adjusting the length of the operating periods of the driving signal group according to the feedback signal so as to adjust the value of the output voltage to be equal to a desired value.

3. The control method of a resonant circuit according to claim 2, wherein the reference signal sets a desired value of the output voltage, and the magnitude of the feedback signal represents the difference between the output voltage and the desired value.

4. The control method of a resonant circuit according to any one of claims 2 and 3, wherein the switching transistor group includes the first switching transistor, the second switching transistor and the third switching transistor, and the first control periods include multiple operating periods of the second switching transistor.

5. The control method of a resonant circuit according to claim 4, wherein the first switching transistor, the second switching transistor, and the third switching transistor are operated at the same frequency in the second driving mode;
   the first switching transistor and the third switching transistor are operated at half the frequency of the second switching transistor in the first driving mode.

6. A control device of a resonant circuit, including:
   a drive control circuit configured to set a first control periods of a switching transistor group, the first control periods including operating periods in a first driving mode and operating periods in a second driving mode;
   a switch setting circuit configured to set a range of output voltages and a range of K values in a directly proportional relationship, wherein each individual K value of the range of K values is the ratio of a number of the operating periods in the second driving mode to a number of the operating periods in the first driving mode;
   a voltage-controlled oscillator configured to receive an existing output voltage, and the switch setting circuit determining the individual K value corresponding to the existing output voltage according to the directly proportional relationship between the range of output voltages and the range of K values; and
   the drive control circuit further configured to output a driving signal group of the switching transistor group according to a number of operating periods in the first driving mode and a number of operating periods in the second driving mode corresponding to the ratio of the determined, individual K value;
   wherein the resonant circuit includes a first capacitor, a second capacitor, a first switching transistor, a second switching transistor, a third switching transistor, a resonant capacitor, a resonant inductor, a first diode, a second diode, a transformer and a rectification circuit;
   wherein the first driving mode is that the first switching transistor and the third switching transistor are conducted alternately within the non-conduction time of the second switching transistor, and the second driving mode is that the first switching transistor and the third switching transistor are conducted simultaneously, and conducted complementarily to the second switching transistor.

7. An electronic apparatus, wherein the control device according to claim 6 is applied thereto.

* * * * *